(12) United States Patent
Perrin et al.

(10) Patent No.: US 6,618,792 B1
(45) Date of Patent: Sep. 9, 2003

(54) METHOD AND APPARATUS FOR LOCATING DATA IN COMPUTER SYSTEMS

(75) Inventors: Neil Perrin, Westminster, CO (US); Andrew M. Rudoff, Boulder, CO (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/544,726

(22) Filed: Apr. 6, 2000

(51) Int. Cl.[7] .............................................. G06F 12/00
(52) U.S. Cl. .................... 711/122; 711/113; 711/145; 711/170; 711/216; 711/4
(58) Field of Search ................................ 711/122, 113, 711/145, 216, 4

(56) References Cited

U.S. PATENT DOCUMENTS

| | | | | |
|---|---|---|---|---|
| 5,129,088 A | * | 7/1992 | Auslander et al. | 711/1 |
| 5,390,318 A | * | 2/1995 | Ramakrishnan et al. | 711/136 |
| 5,673,394 A | * | 9/1997 | Fenwick et al. | 709/312 |
| 5,778,418 A | * | 7/1998 | Auclair et al. | 711/101 |
| 6,370,614 B1 | * | 4/2002 | Teoman et al. | 711/113 |
| 6,389,427 B1 | * | 5/2002 | Faulkner | 707/104.1 |
| 6,532,481 B1 | * | 3/2003 | Fassett, Jr. | 707/203 |

OTHER PUBLICATIONS

Kleiman, "Vnodes: An Architecture for Multiple File System Types in Sun UNIX," USENIX, pp 1–10, 1986.*

Quarterman et al., "4.2BSD and 4.3BSD as Examples of the UNIX System," ACM, pp 379–418, 1985.*

Rosenblum et al., "The Design and Implementation of a Log–Structured File System," pp 1–15, ACM, 1991.*

Braunstein et al., "Improving the efficiency of UNIX file buffer caches," pp 71–82, ACM, 1989.*

Vahalia, Uresh, "File System Interface and Framework", 1996, Unix Internals The New Frontiers, Chapter 8, pp. 220–260.

* cited by examiner

Primary Examiner—Matthew Kim
Assistant Examiner—Stephen Elmore
(74) Attorney, Agent, or Firm—Beyer Weaver & Thomas, LLP

(57) ABSTRACT

Improved techniques for providing users and application programs with access to data stored in computer systems are disclosed. The improved techniques are particularly well suited for use in computer systems where data can be logically organized in files presented in a file system. A multilevel caching system suitable for storing information relating to files in the file system is provided. The stored information can include file references suitable for locating files in the file system as well as other useful information about the file system. The multilevel caching system provides the ability to implement various caching strategies at different levels and increases the probability of cache hits when seeking to locate files in a file system. Accordingly, relatively expensive read operations to persistent storage devices can be minimized when locating files in the file system.

18 Claims, 9 Drawing Sheets

METHOD AND APPARATUS FOR LOCATING DATA IN COMPUTER SYSTEMS

BACKGROUND OF THE INVENTION

1. Field of the Invention

The present invention relates to computing systems and, more particularly, to storage and management of data in computing systems.

2. Description of the Related Art

Among other things, the operating system of a computer provides facilities for persistent storage and management of data. The facilities provided by the operating system typically insulate users (applications) from the implementation details used to store and manage data in a computer. For example, Unix operating systems provide abstract concepts such as files, directories, and file systems. A file can be viewed as a logical container for data. The term "file", as used herein, refers to an abstract encapsulation of data.

Although the Unix operating system considers a file as a sequence of bytes, through use of files and directories data can be organized logically and presented to the users in a logical file system. Accordingly, users of Unix operating systems can organize, manipulate, and access different files by interacting with the file system through an interface provided by the operating system. From a user's perspective, Unix files are organized in a hierarchical tree structure. However, it should be noted that Unix operating systems typically store file entries sequentially within a persistent storage device (e.g., sectors of a disk).

FIG. 1A depicts a user's perspective of a portion of a Unix file system. A user (application) can access a file by referencing its full pathname in the logical file system. For example, a file can be referenced by its full pathname "/etc/passwd" where "/" denotes the root of the logical file system, "etc" is a parent file (or directory) of the file "passwd". It should be noted that in Unix a file may serve as a logical directory containing one or more files. For example, FIG. 1A illustrates various directories /, bin, etc, dev, usr, lib and local, and various files TSP, bin, passwd and passwd. For example, file "usr" is a directory containing another file "local" which is itself another directory, and so on. It should be noted that the term file and directory are used herein interchangeably. It should also be noted that in Unix operating systems, file names need only be unique within a directory. Accordingly, another file named "passwd" can exist as "/bin/passwd". Thus, typically, in a Unix operating system a file is identified by its full pathname.

In order to provide a user (application) with access to a file, the operating system typically first performs a linear search to traverse the full pathname to locate the file within a file system. This search typically requires several expensive and time consuming read operations on a persistent storage device (e.g., a disk) where data and the information as to how data segments relate to each other is stored. To minimize read operations on the persistent storage device, some operating systems have employed a directory name look-up cache (DNLC). As a central (global) resource, the directory name look-up cache provides information which can be used to locate most recently used files without having to perform read operations on the persistent storage device (e.g., disk). FIG. 1B depicts a computing environment 100 including a directory name look-up cache 102 suitable for storing filenames and references which provide access to files identified by the filenames. In order to provide access to a file, the operating system 104 first checks the directory name look-up cache 102 to determine whether the desired filename can be found. If the file name is not found in the directory name look-up cache 102, the operating system can initiate a search of a disk 106 to locate the file. Once the desired file is found, information about how to access the file can be cached into the directory name look-up cache 102 for future use.

One problem with conventional usage of directory name look-up caches is that information obtained during search operations to disk are not utilized. Accordingly, relatively expensive and time consuming read operations in disks are often repeated. The conventional usage of directory name look-up caches are especially inefficient for file systems which store directory entries sequentially within disk sectors (e.g., Fast File System (FFS), Unix file system (UFS)). In such file systems, since directory entries are stored sequentially, several relatively expensive and time consuming read operations to disk have to be performed whenever a filename cannot be found in the conventional directory name look-up cache. In view of the foregoing, there is a need for improved methods for providing efficient access to data stored in computing systems.

SUMMARY OF THE INVENTION

Broadly speaking, the invention relates to techniques for providing users and application programs with efficient access to data stored in computer systems. The invention is particularly well suited for use in computer systems where data can be logically organized in a file system. In one aspect of the present invention, a multilevel caching system suitable for storing information relating to files in the file system is provided. The stored information can include file references suitable for locating files in the file system as well as other useful information about the file system. The multilevel caching system provides the ability to implement various caching strategies at different levels and increases the probability of cache hits when seeking to locate files in a file system. Accordingly, relatively expensive read operations to persistent storage devices can be minimized when locating files in the file system.

The invention can be implemented in numerous ways, including a system, an apparatus, a method, or a computer readable medium. Several embodiments of the invention are discussed below.

As a method for locating data in a computer, the data being logically organized as one or more files in a file system, one embodiment of the invention includes the acts of: determining whether information associated with a file can be found in a primary cache; determining whether the information can be found in a secondary cache when the information cannot be found in the primary cache; and searching a storage device to locate at least a portion of data represented by the file on the storage device when the information associated with the file cannot be found in the secondary cache.

As a multilevel caching system for locating data in a computer, the data being logically organized as files in a file system, one embodiment of the invention includes: a primary cache operating to provide storage for storing information relating to one or more files in the file system; a secondary cache operating to provide storage for storing information relating to another one or more files in the file system which is not provided in the primary cache; and a file locator manager operating to search the primary and secondary caches for information relating to a file in the file system.

As a computer readable media including computer program code for locating data in a computer, the data being logically organized as one or more files in a file system, one embodiment of the invention includes: computer program code for determining whether a filename associated with a file can be found in a primary cache; computer program code for determining whether the filename can be found in a secondary cache when it is determined that the filename cannot be found in the primary cache; computer program code for initiating a search of a storage device to locate at least a portion of data represented by the file on the storage device when it is determined that the filename associated with the file cannot be found in the secondary cache; and computer program code for storing information in the secondary cache when it is determined that the filename cannot be found in the secondary cache.

The advantages of the invention are numerous. Different embodiments or implementations may have one or more of the following advantages. One advantage of the invention is that access to data can be achieved more efficiently. Another advantage of the invention is that useful information can be gathered at a nominal processing cost. Still another advantage is that the invention allows various caching strategies to be employed at different caching levels.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to techniques for providing users and application programs with efficient access to data stored in computer systems. The invention is particularly well suited for use in computer systems where data can be logically organized in a file system. In one aspect of the present invention, a multilevel caching system suitable for storing information relating to files in the file system is provided. The stored information can include file references suitable for locating files in the file system as well as other useful information about the file system. The multilevel caching system provides the ability to implement various caching strategies at different levels and increases the probability of cache hits when seeking to locate files in a file system. Accordingly, relatively expensive read operations to persistent storage devices can be minimized when locating files in the file system.

Embodiments of the invention are discussed below with reference to FIGS. 2A–6B. However, those skilled in the art will readily appreciate that the detailed description given herein with respect to these figures is for explanatory purposes as the invention extends beyond these limited embodiments.

Figure 1A:
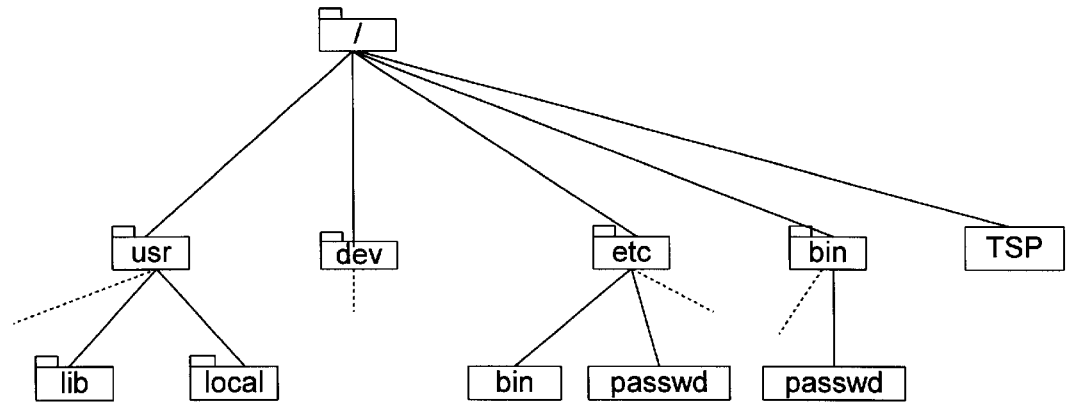
FIG. 1A illustrates a user's perspective of a portion of a Unix file system.
Figure 1B:
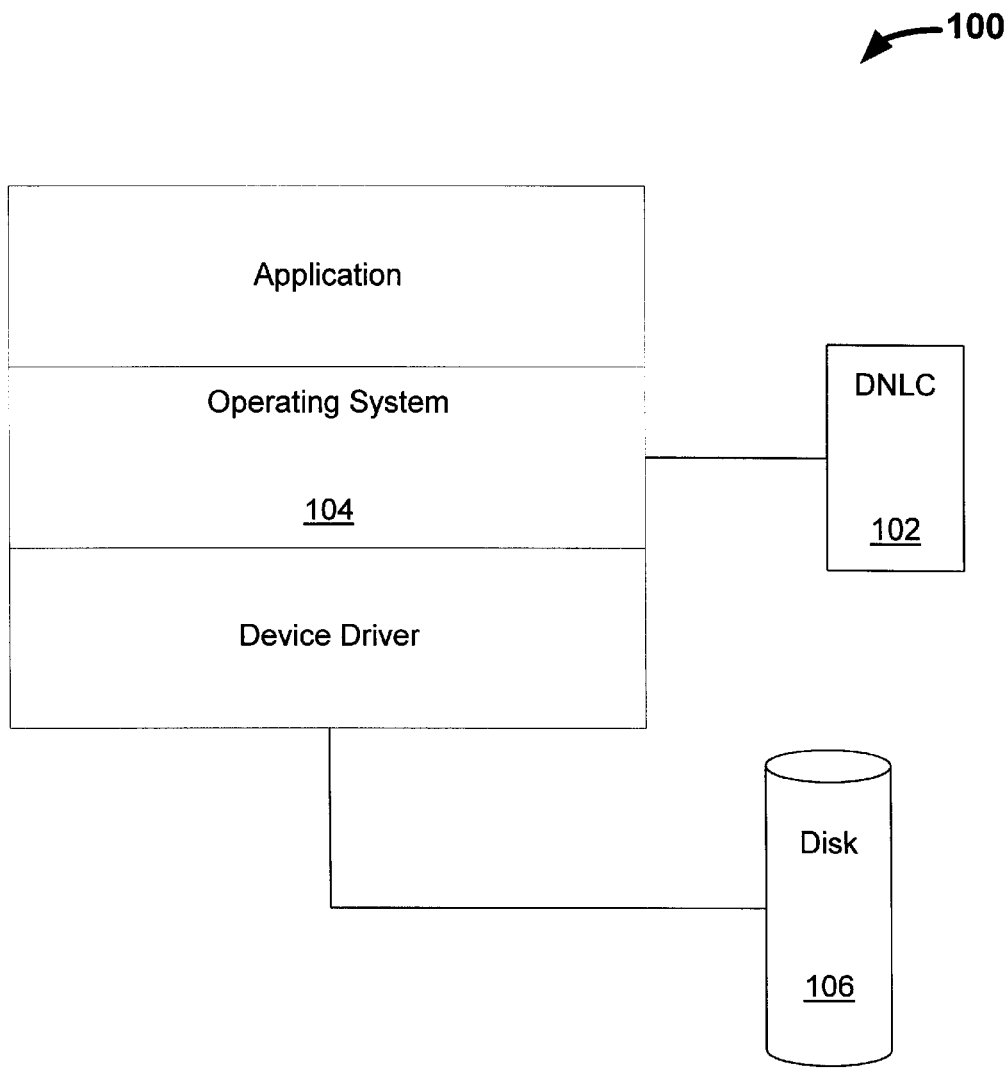
FIG. 1B illustrates a computing environment including a directory name look-up cache.
Figure 2A:
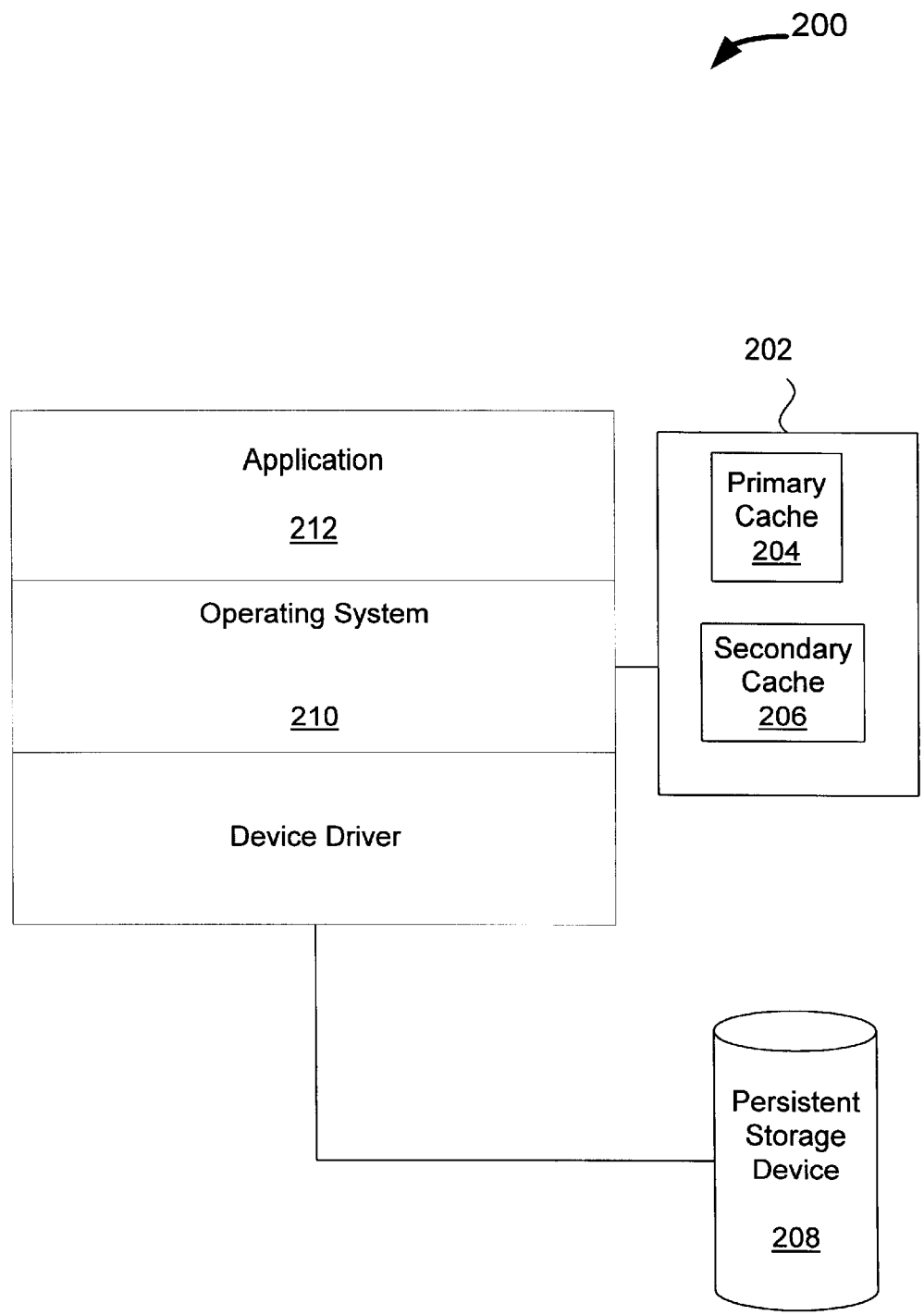
FIG. 2A illustrates a computing environment including a multilevel caching system in accordance with one embodiment of the present invention.

FIG. 2A illustrates a computing environment 200 including a multilevel caching system 202 in accordance with one embodiment of the present invention. The multilevel caching system 202 includes a primary cache 204 and a secondary cache 206. The secondary cache 206 is suitable for storing information to allow efficient access to files stored in a persistent storage device 208. In one embodiment, primary cache 204 is utilized as a central resource available to the operating system 210 to locate files which are physically present in the persistent storage device 208. For example, the primary cache 204 can be used to efficiently store information about most recently used files, most frequently used files, etc. The stored information in the primary cache 204 includes filenames and their respective references which allow a limited number of files on the persistent storage device 208 to be located without requiring read operations to the persistent storage device 208. Accordingly, primary cache 204 allows the operating system 210 to locate files on the persistent storage device 208 in an efficient manner.

In addition to the primary cache 204, the multilevel caching system 202 provides the secondary cache 206 for improved performance. The secondary cache 206 allows storage of useful information about files on the persistent storage device 208. For example, the stored information can include filenames and references to file names found in a particular parent file (directory). Accordingly, this information can be provided to the operating system 210 when access to a file is requested and that file is not available on the primary cache 204. As will be appreciated by those skilled in the art, the information stored in the secondary cache 206 can be acquired as searches of the persistent storage device 208 are performed. Accordingly, the stored information in the secondary cache 206 can be utilized to avoid repeating read operations to the persistent storage device 208. Furthermore, the stored information can be obtained at a nominal cost when a search is otherwise being performed. It should be noted that other useful information can be stored in the secondary cache 206. For example, the location and size of free blocks of data on the persistent storage device 208 can be stored in the secondary cache 206 and provided to the operating system 210. It should also be noted that although the multilevel caching system 202 is depicted as having two levels (i.e., primary and secondary caches 204 and 206), as will be appreciated by those skilled in the art in view of this disclosure, additional caching levels may be utilized.

Figure 2B:
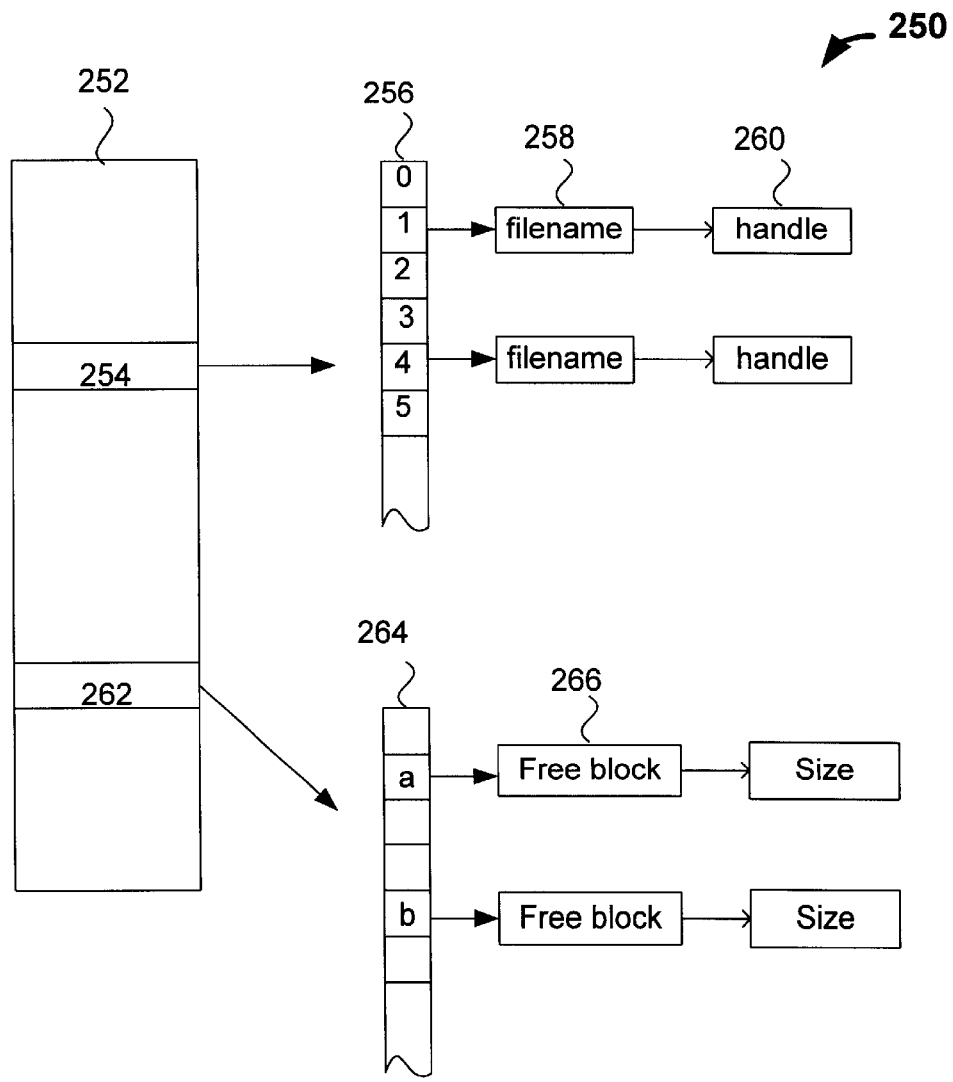
FIG. 2B illustrates a secondary cache in accordance with one embodiment of the present invention.

FIG. 2B illustrates a secondary cache 250 (shown as 206 in FIG. 2A) in accordance with one embodiment of the present invention. The secondary cache 250 includes a directory cache 252 which is associated with directory A in the file system. It should be noted that although for simplicity only one directory cache 252 has been shown, the secondary cache 250 typically includes a plurality of directory caches, wherein each directory cache is associated with a particular directory in the file system. As depicted in FIG. 2B, the directory cache 252 provides a reference 254 to a hash table 256. The file names and file references (handles) for the files found in the directory A can be organized in the hash table 256. For example, a hash index 1 provides reference to a file name 258 and a handle 260 for the file identified by the file name 258. The file identified by the filename 258 can be located using the file handle 260. In addition, the directory cache 252 provides a reference 262 to a hash table 264 which provides information about free blocks of data available in the directory A. For example, a hash index "a" provides reference to a free block entry 266 which is a free block of memory that is available for use. It should be noted that the information about free blocks can be organized in a variety of suitable data structures (e.g., table, linked list) and it is not necessary for the information to be organized using a hashing scheme. It should be noted that information about files logically residing in the directory A (e.g., file name 258 and handle 260) can also be organized in accordance with a variety of suitable techniques and it is not necessary for the information to be organized using a hashing scheme.

Figure 3:
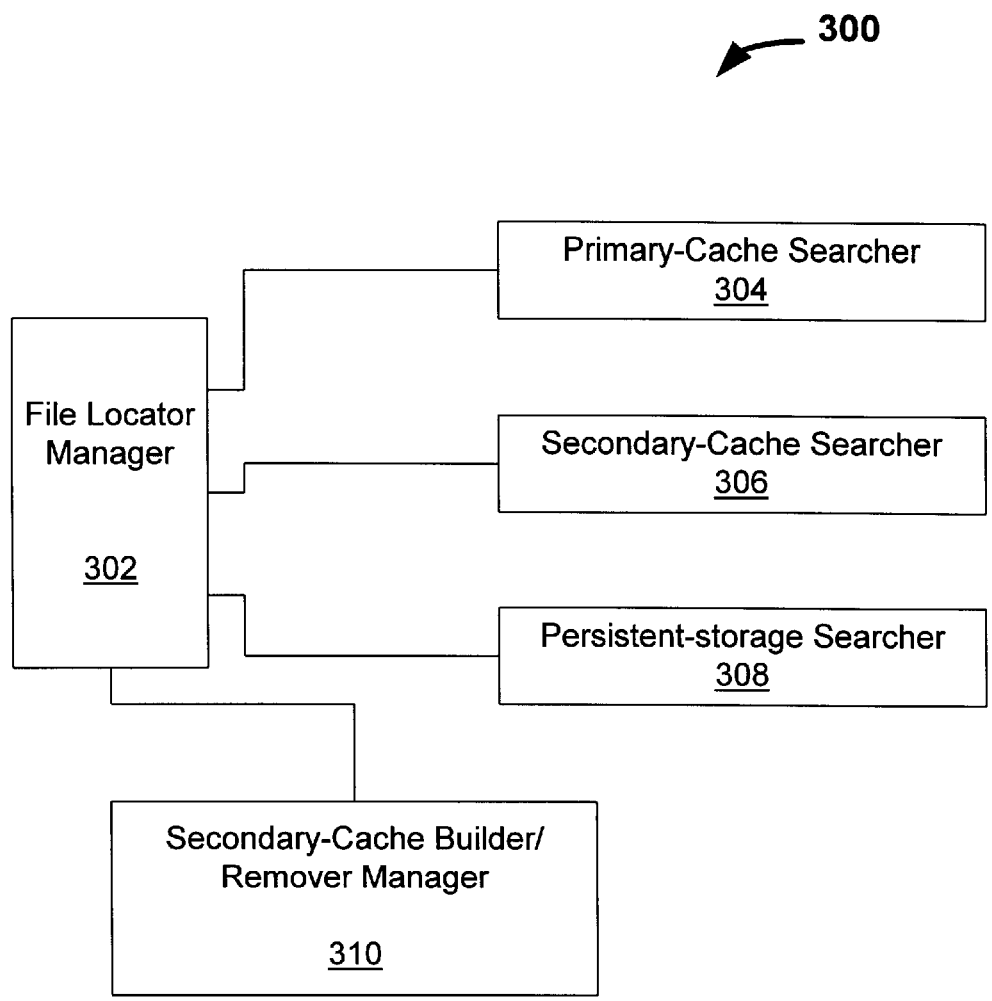
FIG. 3 illustrates a multilevel caching system in accordance with another embodiment of the present invention.

FIG. 3 illustrates a multilevel caching system 300 in accordance with one embodiment of the present invention. The multilevel caching system 300 includes a file locator manager 302, a primary-cache searcher 304, a secondary-cache searcher 306, a persistent-storage searcher 308, and a secondary cache builder/remover 310. The file locator manager 302 can receive a request to locate a file. The file can be identified by a filename (e.g., full pathname of a file in a Unix system). The request to access the file can be made by the operating system which is processing a user's (or an application program's) request to access the file. The file locator manager 302 initially invokes the primary-cache searcher 304 in order to determine whether information about how to access the requested file is available in a primary cache. If this information is not available in the primary cache, the file locator manager 302 invokes the secondary cache searcher 306 in order to determine whether information about how to access the requested file is available in the secondary-cache. If the information about how to access the requested file is not available in the secondary cache, then the file locator manager 302 invokes the persistent-storage searcher 308 to perform a search on the appropriate persistent-storage device (e.g., a disk) where the file is stored. When the persistent-storage searcher 308 is searching the appropriate persistent-storage device, the secondary cache builder/remover 310 determines whether the information obtained from the search should be stored in the secondary cache. For example, this determination can be made based on the size of the parent file (directory) containing the file identified by the filename. Here, the information obtained is forwarded to the secondary cache builder/remover 310 for storage to the secondary cache. For example, for a particular directory, useful information about the directory (e.g., filenames and references to the files, free spaces and their size) can be stored in the secondary cache. The file locator manager 302 can also invoke the secondary cache builder/remover 310 to build and remove storage spaces in the secondary cache. For example, new space can be allocated for a new directory cache entry or space previously allocated to a directory cache entry can be removed by the secondary cache builder/remover 310.

Figure 4:
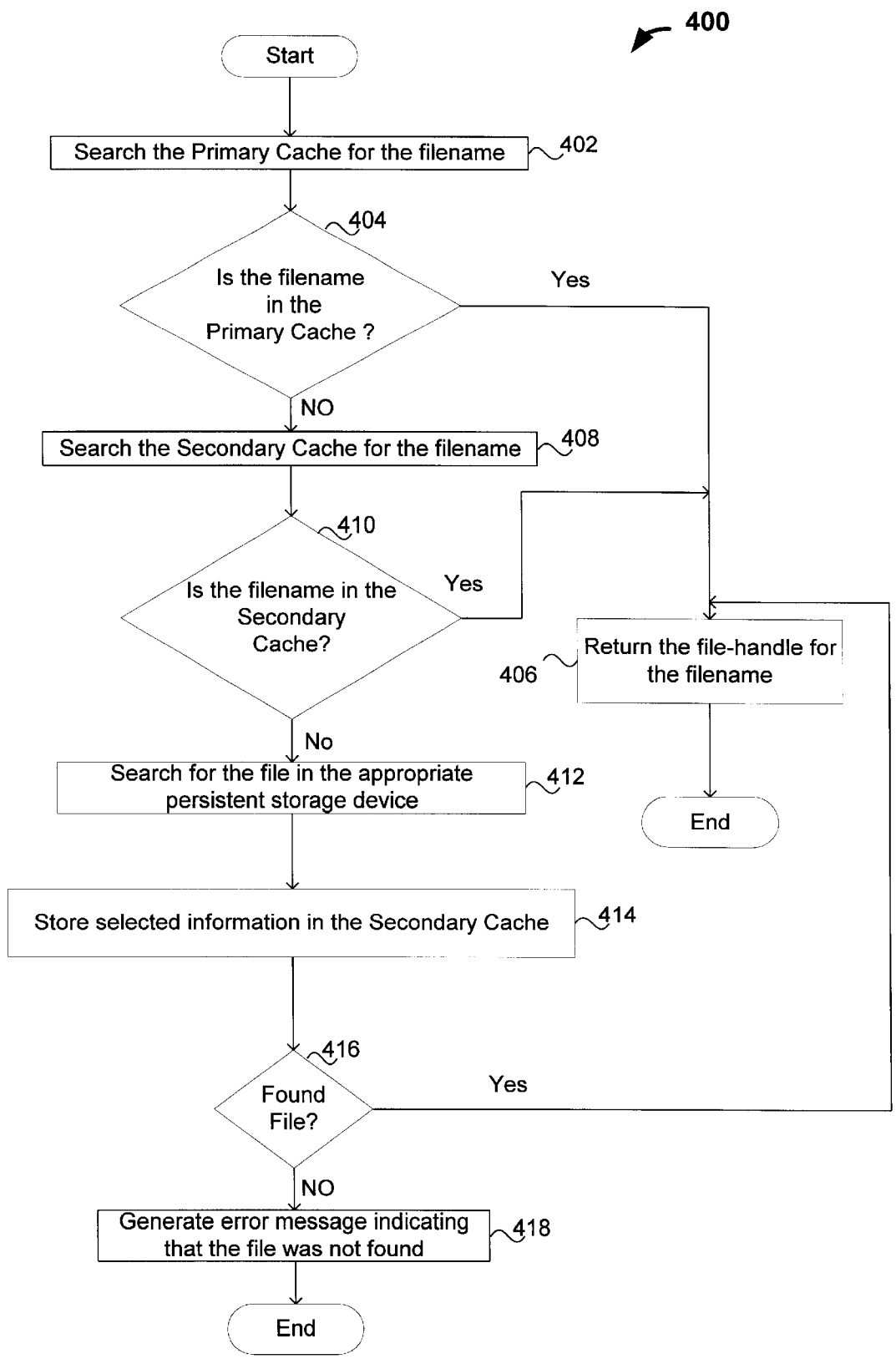
FIG. 4 illustrates a file locating method for locating files in a file system in accordance with one embodiment of the invention.

FIG. 4 illustrates a file locating method 400 for locating files in a file system in accordance with one embodiment of the invention. The file locating method 400 makes use of a primary cache and a secondary cache. The files are typically stored on a persistent storage device (e.g., a disk). Typically, files in the file system can be identified by a filename (e.g., a full pathname for Unix files). A user (or an application program) can access a file by making a request to the operating system, which in turn, locates the file. Accordingly, the operating system provides the user (or application program) with a reference to the file. The user can then perform various operations on the file (e.g., read, write, etc.) using the reference to the file.

Initially, at operation 402, the primary cache is searched for the filename. Next, at operation 404, a determination is made as to whether the filename has been found in the primary cache. If the filename is found in the primary cache, the file reference (handle) for the filename is returned at operation 406. However, if the filename is not found in the primary cache, the file locating method 400 proceeds to operation 408 where the secondary cache is searched for the filename. Next, at operation 410, a determination is made as to whether the filename has been found in the secondary cache. If the filename is found in the secondary cache, the file reference (handle) for the filename is returned at operation 406. However, if the filename is not found in the secondary cache, the file locating method 400 proceeds to operation 412 where the appropriate persistent storage device (e.g., disk) is searched to locate the file identified by the filename. At operation 414, selected information obtained during the searching performed at operation 412 is stored in the secondary cache. At operation 416 a determination is made as to whether the file identified by the filename has been located. If the file has been located, the file reference (handle) is returned at operation 406. However, if the file has not been found, an error can be generated at operation 418 to indicate that the file has not been found. The file locating method 400 ends following operation 418.

Figure 5A:
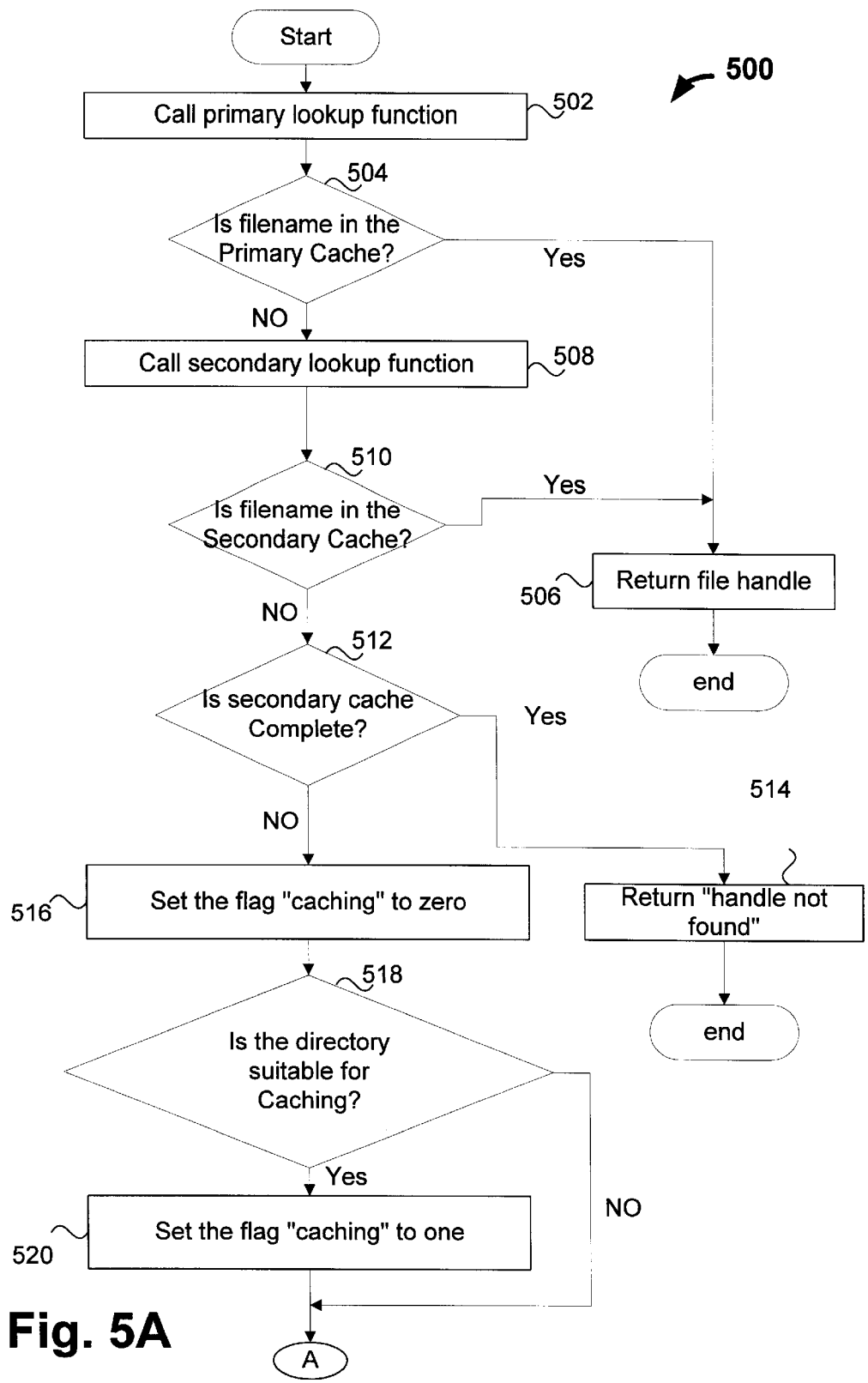
FIGS. 5A and 5B illustrate a file locating method for locating files in a file system in accordance with another embodiment of the present invention.
Figure 5B:
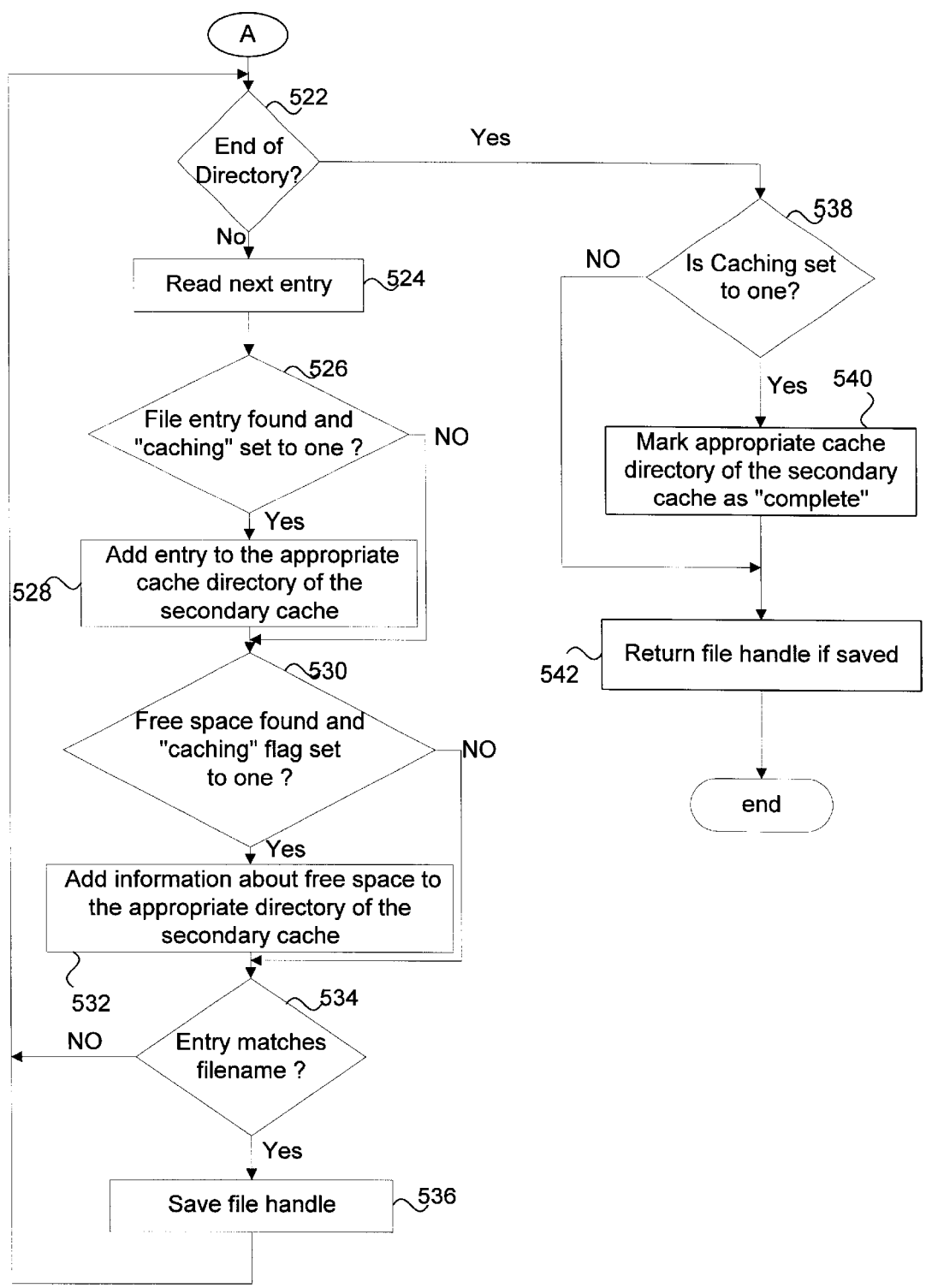

FIGS. 5A and 5B illustrate a file locating method 500 for locating files in a file system in accordance with another embodiment of the present invention. The file locating method 500 makes use of a primary cache and a secondary cache. The files are typically stored on a persistent storage device (e.g., a disk). Typically, files in the file system can be identified by a filename (e.g., a full pathname for Unix files). A user (or an application program) can access a file by making a request to the operating system, which in turn, locates the file. Accordingly, the operating system provides the user (or application program) with a reference to the file. The user can then perform various operations on the file (e.g., read, write, etc.) using the reference to the file.

Initially, at operation 502, a primary look-up function is called to perform a search for the filename in the primary cache. In one embodiment, the primary cache is implemented as a central resource which stores information about files in the file system. It should be noted that the information about all files can be stored in the primary cache irrespective of their directory. Accordingly, as a central resource, the primary cache can include information about files from various directories based on desired selection criteria (e.g., most recently used, most frequently used, etc.) The information stored in the primary cache typically includes filenames and file references (handles) to the files. As noted earlier, such information can be mapped and arranged in accordance with an ordering scheme (e.g., a hashing scheme). Next, at operation 504, a determination is made as to whether the filename can be found in the primary cache. If the filename is found in the primary cache, the file handle is returned at operation 506. After operation 506 returns the file handle, the file locating method 500 ends. However, if the filename is not found in the primary cache, the file locating method 500 proceeds to operation 508 where a secondary lookup function is called to search the secondary cache for the filename. Next, at operation 510, a determination is made as to whether the filename can be found in the secondary cache. If the filename is found in the secondary cache, the file handle is returned at operation 506.

On the other hand, if the filename is not found in the secondary cache, the file locating method 500 proceeds to operation 512 where a determination is made as to whether the information in the second cache is complete with respect to the desired filename. For example, a determination can be made as to whether all the filenames in a parent directory of the file have been cached in the secondary cache. As a more particular example, in a Unix system, a determination as to whether the parent directory "/etc" has been completely cached when a search for the filename "/etc/passwd" is performed on the secondary cache. If it is determined at operation 512 that the information in secondary cache is complete with respect to the filename, the locating method 500 proceeds to operation 514 where "handle not found" indicator is returned. However, if it is determined at operation 512 that information in the secondary cache is not complete with respect to the filename, the locating method 500 proceeds to operation 516 where the flag "caching" is set to zero. Next, at operation 518, a determination is made as to whether a parent file (directory) of the file is suitable for caching. For example, this determination can be made based on the number of files (and directories) contained in the parent file (directory). This allows caching to be avoided for small directories where little or no advantage would be obtained.

If the parent file (directory) is suitable for caching, at operation 520, the flag "caching" is set to one to permit caching. Alternatively, operation 520 is bypassed when operation 518 determines that the parent file (directory) of the file is not suitable for caching. At operation 522, a determination is made as to whether the end of parent file (directory) has been reached (e.g., are there more files or directories in the directory that have not been read). If it is determined at operation 522 that the end of directory has not been reached, the file locating method 500 proceeds to operation 524 where the next entry is read from the persistent storage device. The next entry is an entry in the parent file (directory) which can be a file or another directory containing one or more files. Next, at operation 526, a determination is made as to whether a file entry has been found and whether the flag caching has the value one. In the event of a positive determination, the file locating method 500 proceeds to operation 528 where the file entry is added to the appropriate cache directory of the secondary cache. In the event of a negative determination at operation 526, the file locating method 500 bypasses the operation 528.

At operation 530, following operations 526 or 528, a determination is made as to whether free space has been found and whether the caching flag is set to one. In the event of a positive determination, the file locating method 500 proceeds to operation 532 where information about free space found is cached in an appropriate directory cache of the secondary cache. For example, the information cached at operation 532 can include a reference to location of the free space, size of the free space, etc. In the event of a negative determination at operation 530, the file locating method 500 bypasses operation 532. At operation 534 a determination is made as to whether the filename of the entry matches the desired filename. If the filename of the entry matches the desired filename, the file handle for the entry is saved at operation 536. Following operation 534, when the filename of the entry does not match the desired filename or following operation 536 when the filename of the entry does match the desired filename, the file locating method 500 proceeds back to operation 522 so that the appropriate directory cache of the secondary cache can continue to be built.

At operation 522 a determination is made as to whether the end of directory has been reached. When it is determined at operation 524 that the end of the parent file (directory) has been reached, the file locating method 500 proceeds to operation 538 where a determination is made as to whether the flag "caching" is set to one. If it is determined at operation 538 that the flag caching is set to one, the file locating method 500 proceeds to operation 540 where the appropriate directory cache of the secondary cache is marked as "complete". Alternatively, operation 540 is bypassed when it is determined at operation 538 that the flag caching is not set to one. Following operation 540 as well as following operation 538 when the flag "caching" is not set to one, the file handle of the desired file can be returned at operation 542 when it was been previously saved (at operation 536). Following operation 542, the file locating method 500 is complete and ends.

Figure 6A:
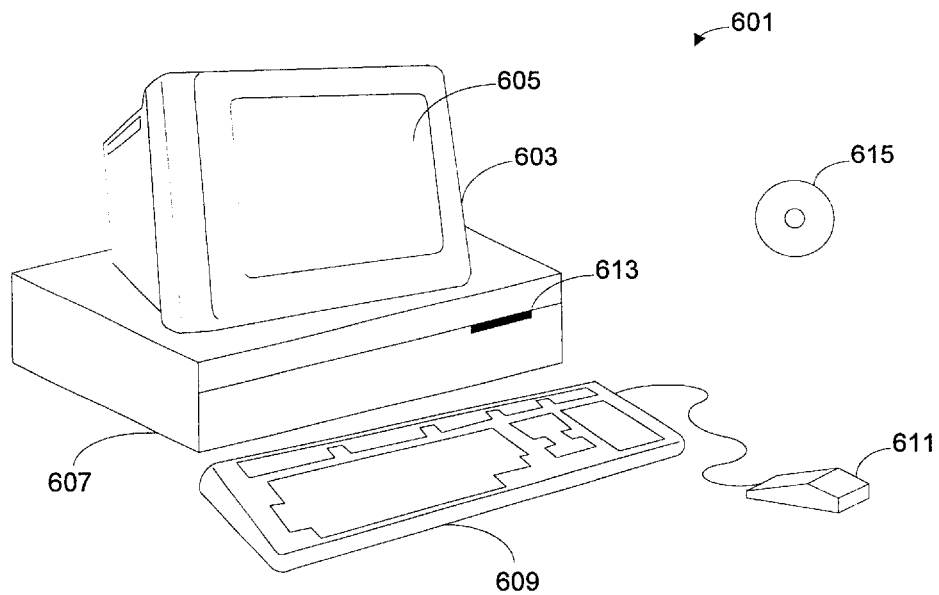
FIGS. 6A and 6B illustrate an example of a computer system that may be used in accordance with the invention.
Figure 6B:
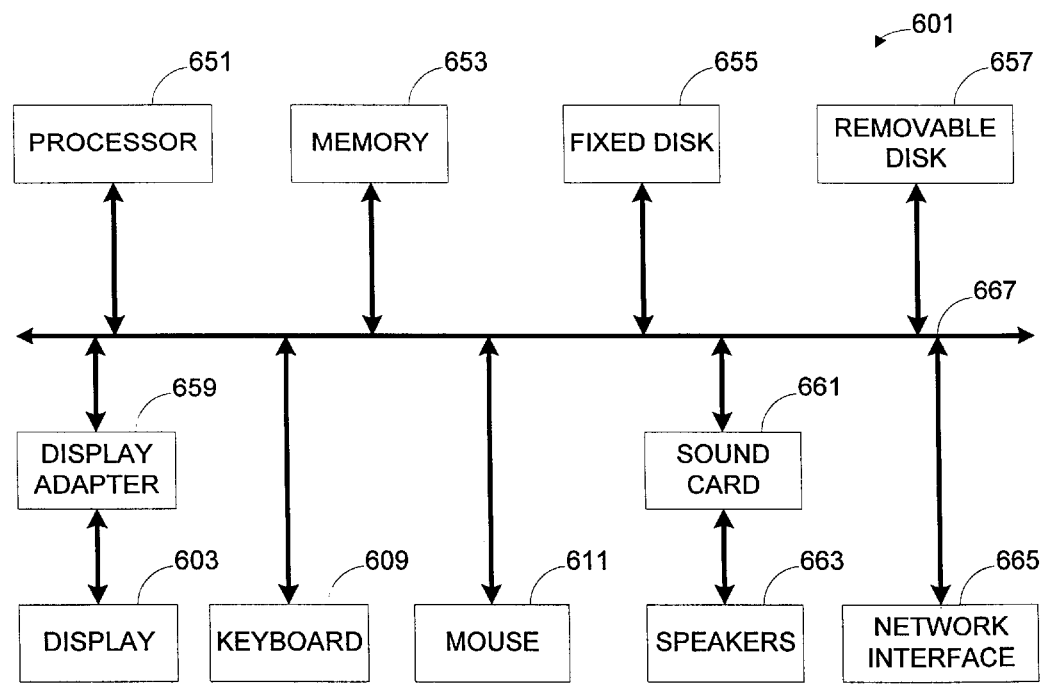

FIGS. 6A and 6B illustrate an example of a computer system that may be used in accordance with the invention. FIG. 6A shows a computer system 601 that includes a display 603, screen 605, cabinet 607, keyboard 609, and mouse 611. Mouse 611 may have one or more buttons for interacting with a graphical user interface. Cabinet 607 houses a CD-ROM drive 613, system memory and a hard drive (see FIG. 6B) which may be utilized to store and retrieve software programs incorporating computer code that implements the invention, data for use with the invention, and the like. Although CD-ROM 615 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 601 is provided in the system memory, the hard drive, the CD-ROM 615 or other computer readable storage medium and serves to incorporate the computer code that implements the invention.

FIG. 6B shows a system block diagram of computer system 601 used to execute the software of an embodiment of the invention. As in FIG. 6B, computer system 601 includes monitor 603 and keyboard 609, and mouse 611. Computer system 601 further includes subsystems such as a central processor 651, system memory 653, fixed storage 655 (e.g., hard drive), removable storage 657 (e.g., CD-ROM drive), display adapter 659, sound card 661, speakers 663, and network interface 665. The central processor 651, for example, can execute computer program code (e.g., an operating system) to implement the invention. An operating system is normally (but not necessarily) resident in the system memory 653 during its execution. Other computer systems suitable for use with the invention may include additional or fewer subsystems. For example, another computer system could include more than one processor 651 (i.e., a multi-processor system) or a cache memory.

The system bus architecture of computer system 601 is represented by arrows 667. However, these arrows are illustrative of any interconnection scheme serving to link the subsystems. For example, a local bus could be utilized to connect the central processor to the system memory and display adapter. Computer system 601 shown in FIG. 6B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations may have one or more of the following advantages. One advantage of the invention is that access to data can be achieved more efficiently. Another advantage of the invention is that useful information can be gathered at a nominal processing cost. Still another advantage is that the invention allows various caching strategies to be employed at different caching levels.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for locating data in a computer, said data being logically organized as one or more files in a file system, said method comprising:
    (a) determining whether information needed to locate a file can be found in a primary cache;
    (b) determining whether the information can be found in a secondary cache when said determining (a) determines that the information cannot be found in the primary cache;
    (c) searching a storage device to locate at least a portion of data represented by the file on the storage device when said determining (b) determines that the information associated with the file cannot be found in the secondary cache; and
    (d) storing in said secondary cache at least a portion of the information obtained during said searching of said storage device when said determining (b) determines that the information cannot be found in said secondary cache, wherein the information stored in said secondary cache includes information needed to locate at least another file that was encountered during said searching of said storage device.

2. A method as recited in claim 1, wherein the information stored in the secondary cache includes at least one file reference, said file reference providing a reference which can be used to locate at least a portion of data represented by a file.

3. A method as recited in claim 1, wherein the information stored in the secondary cache includes at least one reference to a free space on the data storage device.

4. A method as recited in claim 1,
    wherein the second cache includes a plurality of storage portions, and
    wherein said storing information in the secondary cache includes storing information about at least one file in each one of said plurality of storage portions.

5. A method as recited as recited in claim 4, wherein at least one of said plurality of storage portions represents a directory cache suitable for storing information about files logically organized in a parent file.

6. A method as recited as recited in claim 5, wherein in the directory cache file names are mapped to their respective file references using a hashing scheme.

7. A method as recited as recited in claim 5, wherein the file system is a Unix file system.

8. A method as recited as recited in claim 1, wherein the file system is a Unix file system.

9. A method as recited in claim 1, wherein the method further comprises:
    returning a file reference suitable for locating the file when said determining (a) determines that the information can be found in the primary cache; and
    returning a file reference suitable for locating the file when said determining (b) determines that the information can be found in a secondary storage.

10. A multilevel caching system for locating data in a computer, said data being logically organized as files in a file system, said multilevel caching system comprising:
    a primary cache operating to provide storage for storing information relating to one or more files in the file system;
    a secondary cache operating to provide storage for storing information relating to another one or more files in the file system which is not provided in the primary cache; said secondary cache serving as a secondary cache which is searched after unsuccessful search of the primary cache in order to locate information relating to another one or more files in the file system;
    a file locator manager operating to first search the primary cache and then the secondary cache for information relating to a file in the file system and;
    wherein the file locator manager is configured to store information relating to one or more files in the secondary cache; said information being obtained during said searching of said storage device when it is determined that said information is neither available on the primary nor on the secondary cache, and
    wherein the information stored in said secondary cache includes information needed to locate at least another file that was encountered during said searching of said storage device when it is determined that said information is neither available on the primary nor on the secondary cache.

11. A multilevel caching system as recited in claim 10, wherein the information relating to another one or more files stored in the secondary cache includes one or more file references suitable for locating at least a portion of data represented by the one or more files.

12. A multilevel caching system as recited in claim 10, wherein the file locator manager searches the secondary cache for information relating to the file by looking up a filename which identifies the file.

13. A method for locating data in a computer, said data being logically organized as one or more files in a file system, said method comprising:
    determining whether a filename associated with a file can be found in a primary cache;

determining whether the filename can be found in a secondary cache when it is determined that the filename cannot be found in the primary cache;

searching a storage device to locate at least a portion of data represented by the file on the storage device only when it is first determined that the filename associated with the file cannot be found in the secondary cache;

storing in the secondary cache at least a portion of information obtained during said searching of said storage device when it is determined that the filename is neither in the primary cache, nor in the secondary cache; and wherein the information stored in the secondary cache includes at least one file reference, said file reference providing a reference which can be used to locate at least a portion of data represented by a file; and wherein the information stored in the secondary cache as a result of said searching of said storage device also includes at least another file reference, said another file reference providing a reference which can be used to locate at least another portion of data represented by another file which was encountered during said searching of said storage device.

14. A method as recited in claim 13, wherein the information stored in the secondary cache includes at least one reference to a free space on the data storage device.

15. A computer readable media including computer program code for locating data in a computer, said data being logically organized as one or more files in a file system, said computer readable media comprising:

computer program code for determining whether a filename associated with a file can be found in a primary cache;

computer program code for determining whether the filename can be found in a secondary cache when it is determined that the filename cannot be found in the primary cache;

computer program code for searching a storage device to locate at least a portion of data represented by the file on the storage device when it is determined that the filename associated with the file is neither in the primary, nor in the secondary cache; and computer program code for storing in the secondary cache information obtained during said searching of said storage device when it is determined that the filename is neither in the primary, nor in the secondary cache wherein the information stored in said secondary cache includes information needed to locate at least another file that was encountered during said searching of said storage device when it is determined that said information is neither in the primary cache, nor in the secondary cache.

16. A computer readable media as recited in claim 15, wherein the information is stored in the secondary cache while search of the storage device is performed.

17. A computer readable media as recited in claim 16, wherein the information stored in the secondary cache includes at least one file reference, said file reference providing a reference which can be used to locate at least a portion of data represented by a file.

18. A computer readable media as recited in claim 16, wherein the information stored in the secondary cache includes at least one reference to a free space on the data storage device.

* * * * *